United States Patent
Matsugu et al.

(10) Patent No.: US 8,094,881 B2
(45) Date of Patent: Jan. 10, 2012

(54) ACTION RECOGNITION APPARATUS AND METHOD, MOVING-OBJECT RECOGNITION APPARATUS AND METHOD, DEVICE CONTROL APPARATUS AND METHOD, AND PROGRAM

(75) Inventors: Masakazu Matsugu, Chiba (JP); Katsuhiko Mori, Kawasaki (JP); Mie Ishii, Machida (JP); Yusuke Mitarai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 11/035,240

(22) Filed: Jan. 13, 2005

(65) Prior Publication Data

US 2005/0157908 A1 Jul. 21, 2005

(30) Foreign Application Priority Data

Jan. 15, 2004 (JP) ................................. 2004-007924

(51) Int. Cl.
*G06K 9/00* (2006.01)
(52) U.S. Cl. ........ 382/103; 382/107; 382/115; 382/153; 396/153; 348/152; 348/153; 348/154; 348/155; 348/169
(58) Field of Classification Search .................. 396/153; 382/103, 107, 115, 123, 128, 153, 155, 159, 382/160, 181, 190, 209, 216, 225, 228, 318; 348/25, 152–155, 161, 169–172; 706/62, 706/12

See application file for complete search history.

(56) References Cited

U.S. PATENT DOCUMENTS

| | | | | |
|---|---|---|---|---|
| 5,502,774 A | * | 3/1996 | Bellegarda et al. | 382/159 |
| 5,564,005 A | * | 10/1996 | Weber et al. | 715/863 |
| 6,111,580 A | * | 8/2000 | Kazama et al. | 715/863 |
| 6,118,888 A | * | 9/2000 | Chino et al. | 382/118 |
| 6,128,396 A | * | 10/2000 | Hasegawa et al. | 382/103 |
| 6,163,322 A | * | 12/2000 | LaChapelle | 345/473 |
| 6,191,773 B1 | * | 2/2001 | Maruno et al. | 345/158 |
| 6,212,510 B1 | * | 4/2001 | Brand | 706/62 |
| 6,347,261 B1 | * | 2/2002 | Sakaue et al. | 700/245 |

(Continued)

FOREIGN PATENT DOCUMENTS

JP  4-33066 A  2/1992

(Continued)

OTHER PUBLICATIONS

Falconer, D.G.; Ficklin, R.W.; Konolige, K.G.; Robot-mounted through-wall radar for detecting, locating, and identifying building occupants Robotics and Automation, 2000. Proceedings. ICRA '00. IEEE International Conference on Apr. 24-28, 2000 pp. 1868-1875 vol. 2.*

(Continued)

*Primary Examiner* — Vikkram Bali
*Assistant Examiner* — Julian Brooks
(74) *Attorney, Agent, or Firm* — Canon USA Inc. IP Division

(57) ABSTRACT

An action recognition apparatus includes an input unit for inputting image data, a moving-object detection unit for detecting a moving object from the image data, a moving-object identification unit for identifying the detected moving object based on the image data, a state detection unit for detecting a state or an action of the moving object from the image data, and a learning unit for learning the detected state or action by associating the detected state or action with meaning information specific to the identified moving object.

12 Claims, 12 Drawing Sheets

U.S. PATENT DOCUMENTS

| | | | |
|---|---|---|---|
| 6,901,561 B1* | 5/2005 | Kirkpatrick et al. | 715/863 |
| 7,324,246 B2* | 1/2008 | Enomoto | 358/538 |
| 7,680,295 B2* | 3/2010 | Yoda et al. | 382/100 |
| 2002/0181765 A1* | 12/2002 | Mori et al. | 382/158 |
| 2003/0091215 A1* | 5/2003 | Lauper et al. | 382/117 |
| 2004/0028260 A1* | 2/2004 | Higaki et al. | 382/118 |
| 2004/0042652 A1* | 3/2004 | Ii et al. | 382/160 |
| 2004/0075540 A1* | 4/2004 | Yasui | 340/426.1 |
| 2005/0105795 A1* | 5/2005 | Singh et al. | 382/160 |
| 2006/0182346 A1 | 8/2006 | Yoda | |

FOREIGN PATENT DOCUMENTS

| | | | |
|---|---|---|---|
| JP | 7-220090 A | | 8/1995 |
| JP | 8-7188 A | | 1/1996 |
| JP | 8-257017 A | | 10/1996 |
| JP | 9-81309 | | 3/1997 |
| JP | 9-161102 A | | 6/1997 |
| JP | 10-149207 A | | 6/1998 |
| JP | 10-162151 A | | 6/1998 |
| JP | 11-249773 A | | 9/1999 |
| JP | 2000-101898 A | | 4/2000 |
| JP | 2000-222361 A | | 8/2000 |
| JP | 2000-293685 A | | 10/2000 |
| JP | 2001-34764 A | | 2/2001 |
| JP | 2001-202524 A | | 7/2001 |
| WO | 03/025859 A | | 3/2003 |
| WO | WO03/025859 | * | 3/2003 |
| WO | WO 03025859 A1 | * | 3/2003 |

OTHER PUBLICATIONS

Thompson, W.B.; Lechleider, P.; Stuck, E.R.; Detecting moving objects using the rigidity constraint. Pattern Analysis and Machine Intelligence, IEEE Transactions on Feb. 1993 pp. 162-166 vol. 2.*

Rui, Y.; Anandan, P.; Segmenting visual actions based on spatio-temporal motion patterns. Computer Vision and Pattern Recognition, 2000. Proceedings. IEEE Conference on Jun. 13-15, 2000 pp. 111-118 vol. 1.*

Fritsch, J.; Lomker, F.; Wienecke, M.; Sagerer, G.; Detecting assembly actions by scene observation. Image Processing, 2000. Proceedings. 2000 International Conference on Sep. 10-13, 2000 pp. 212-215 vol. 1.*

Ju, S.X.; Black, M.J.; Minneman, S.; Kimber, D.; Summarization of videotaped presentations: automatic analysis of motion and gesture Circuits and Systems for Video Technology, IEEE Transactions onSep. 1998 pp. 686-696 vol. 8, Issue 5.*

Rao, B.S.; Durrant-Whyte, H.; A decentralized Bayesian algorithm for identification of tracked targets. Systems, Man and Cybernetics, IEEE Transactions on Nov.-Dec. 1993 pp. 1683-1698 vol. 23, Issue 6.*

Dae-Sik Jang; Gye-Young Kim; Hyung-Il Choi; Kalman Filter Incorporated model updating for Real-time tracking. TENCON '96. Proceedings. 1996 IEEE TENCON. Digital Signal Processing Applications Nov. 26-29, 1996 pp. 878-882 vol. 2.*

Hoshino, "Jinbutsu Dousa Niokeru Kosei No Chushutsu to Saikousei," The Institute of Image Electronics Engineers of Japan, vol. 30, pp. 631-640, 2001.

Trevor Darrell, et al. "Space-Time Gestures", IEEE 1993, pp. 335-340.

J. Yamato, et al. "Recognizing Human Action in Time-Sequential Images Using Hidden Markov Model," IEEE 1992, pp. 379-385.

T. Nishimura, et al., "Non-monotonic Continuous DP for Spotting Recognition of Gestures with Reverse and Stop Motions from Time Varying Images", IEICE 1996,PRMU 96-32, pp. 49-56.

* cited by examiner

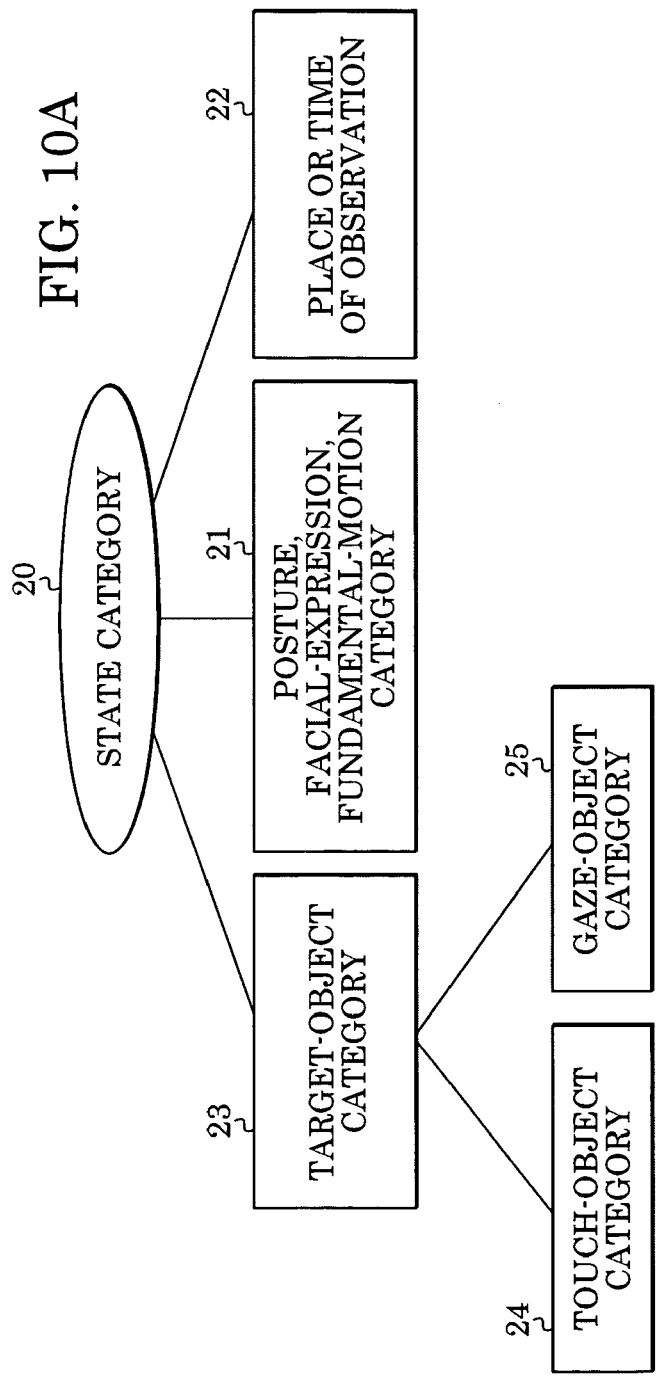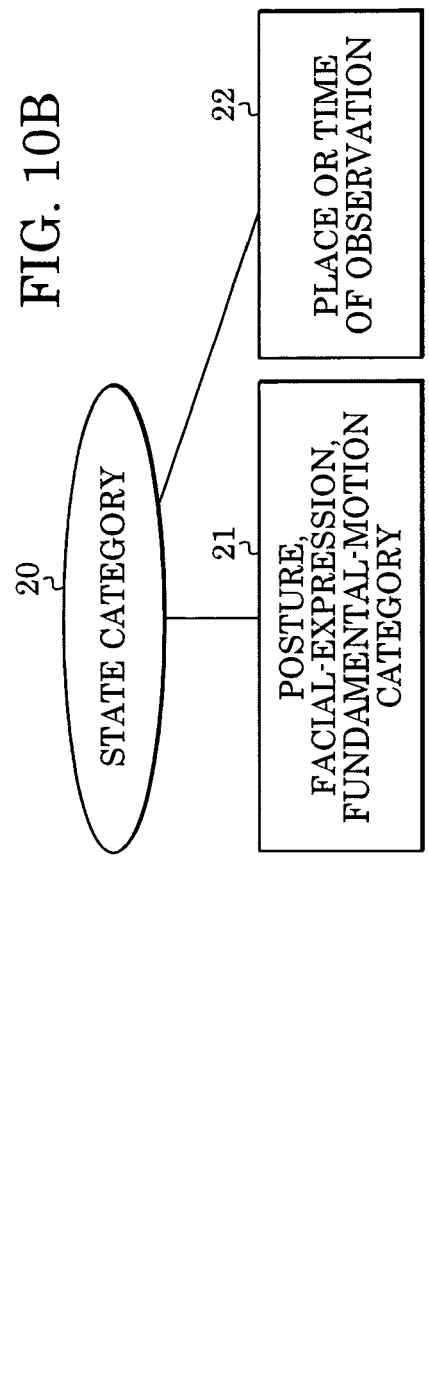

ACTION RECOGNITION APPARATUS AND METHOD, MOVING-OBJECT RECOGNITION APPARATUS AND METHOD, DEVICE CONTROL APPARATUS AND METHOD, AND PROGRAM

BACKGROUND OF THE INVENTION

1. Field of the Invention

The present invention relates to an action recognition apparatus and method, a moving-object recognition apparatus and method, a device control apparatus and method, and a program.

2. Description of the Related Art

As a system or technique employing a known method for detecting a behavior pattern of a person based on images, there are disclosed a behavior detection system that automatically learns a probability model of standard behavior by the use of a hidden Markov model (e.g., Japanese Patent Laid-Open No. 11-259643 and U.S. Pat. No. 6,212,510) and a so-called gesture recognition technique (e.g., Japanese Patent Laid-Open No. 10-162151).

In addition, an applied technology that utilizes information about obtained behavior and an action pattern is proposed (e.g., Japanese Patent Laid-Open No. 8-257017, Japanese Patent Laid-Open No. 9-81309, Japanese Patent Laid-Open No. 9-161102, Japanese Patent Laid-Open No. 11-249773, Japanese Patent Laid-Open No. 2000-293685, Japanese Patent Laid-Open No. 2000-101898, Japanese Patent Publication No. 2801362, and Japanese Patent Publication No. 3140911). On the other hand, a method for performing person authentication from an action pattern is also proposed (e.g., Japanese Patent Laid-Open No. 2000-222361, Japanese Patent Laid-Open No. 2001-34764, and Japanese Patent Laid-Open No. 2001-202524).

Furthermore, there is also available an interface for identifying an operator through password analysis or fingerprint recognition to provide an operating screen suitable for the operator, as disclosed in Japanese Patent Laid-Open No. 10-149207. Unfortunately, in the above-described methods for detecting a behavior pattern and methods for using the information about the detected behavior pattern, a moving object, such as a subject person, cannot be identified to recognize and learn actions and states specific to the moving object. For example, with the method disclosed in the above-described Japanese Patent Laid-Open No. 9-161102, where individuals are identified based on their walking patterns, it is difficult to distinguish persons having similar walking patterns from each other. Therefore, it is difficult to automatically personalize a working environment, such as to provide individual environmental settings or individual settings related to operating procedures for and modes of various devices according to detected action patterns, such as gestures, of a particular person. With the above described known methods, it cannot also be expected to enable a system to automatically learn habitual or routine behavior specific to a particular person and the category of articles routinely used by the person.

With regard to the above-described known method for person authentication from action patterns, as the number of persons to be authenticated increases, it is necessary to specify the corresponding actions more strictly and the persons are required to pay more attention to faithfully reproduce actions registered for authentication. Thus, it is difficult to rely on action patterns only to perform successful person authentication.

SUMMARY OF THE INVENTION

According to one aspect of the present invention, an action recognition apparatus includes: an input unit for inputting image data; a moving-object detection unit for detecting a moving object from the image data; a moving-object identification unit for identifying the detected moving object based on the image data; a state detection unit for detecting a state or an action of the moving object from the image data; and a learning unit for learning the detected state or action by associating the detected state or action with semantic information specific to the identified moving object.

According to another aspect of the present invention, a moving-object recognition apparatus includes: an input unit for inputting image data; a moving-object detection unit for detecting a moving object from the image data; a state detection unit for detecting a state or an action of the moving object from the image data; and a moving-object identification unit for identifying the moving object from either the detected state or action and the image data.

According to still another aspect of the invention, a device control apparatus for controlling a predetermined device includes: an input unit for inputting image data; a moving-object detection unit for detecting a moving object from the image data; a moving-object identification unit for identifying the moving object based on the image data; a state detection unit for detecting a state of the moving object from the image data; a learning unit for learning the detected state by associating the detected state with device control information specific to the identified moving object, the device control information being used to control the predetermined device; and a control-signal output unit for generating a control signal that controls the predetermined device based on the detected state.

According to still another aspect of the present invention, an action recognition method includes: an input step of inputting image data; a moving-object detection step of detecting a moving object from the image data; a moving-object identification step of identifying the detected moving object based on the image data; a state detection step of detecting a state or an action of the moving object from the image data; and a learning step of learning the detected state or action by associating the detected state or action with semantic information specific to the identified moving object.

According to another aspect of the present invention, a moving-object recognition method includes: an input step of inputting image data; a moving-object detection step of detecting a moving object from the image data; a state detection step of detecting a state or an action of the moving object from the image data; and a moving-object identification step of identifying the moving object from either the detected state or action and the image data.

According to still another aspect of the present invention, a device control method for controlling a predetermined device includes: an input step of inputting image data; a moving-object detection step of detecting a moving object from the image data; a moving-object identification step of identifying the moving object based on the image data; a state detection step of detecting a state of the moving object from the image data; a learning step of learning the detected state by associating the detected state with device control information specific to the identified moving object, the device control information being used to control the predetermined device; and a control-signal output step of generating a control signal that controls the predetermined device based on the detected state.

According to another aspect of the present invention, an action recognition program causes a computer to execute: an input module for inputting image data; a moving-object detection module for detecting a moving object from the image data; a moving-object identification module for identifying the detected moving object based on the image data; a state detection module for detecting a state or an action of the moving object from the image data; and a learning module for learning the detected state or action by associating the detected state or action with semantic information specific to the identified moving object.

According to another aspect of the present invention, a moving-object recognition program causes a computer to execute: an input module for inputting image data; a moving-object detection module for detecting a moving object from the image data; a state detection module for detecting a state or an action of the moving object from the image data; and a moving-object identification module for identifying the moving object from either the detected state or action and the image data.

According to still another aspect of the present invention, a device control program for controlling a predetermined device causes a computer to execute: an input module for inputting image data; a moving-object detection module for detecting a moving object from the image data; a moving-object identification module for identifying the moving object based on the image data; a state detection module for detecting a state of the moving object from the image data; a learning module for learning the detected state by associating the detected state with device control information specific to the identified moving object, the device control information being used to control the predetermined device; and a control-signal output module for generating a control signal that controls the predetermined device based on the detected state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10A shows an expression form of a state category in dictionary data where a target object of an action is present.

FIG. 10B shows an expression form of a state category in dictionary data where a target object of an action is not present.

DESCRIPTION OF THE PREFERRED EMBODIMENTS

Embodiments according to the present invention will now be described with reference to the drawings.

Figure 1:
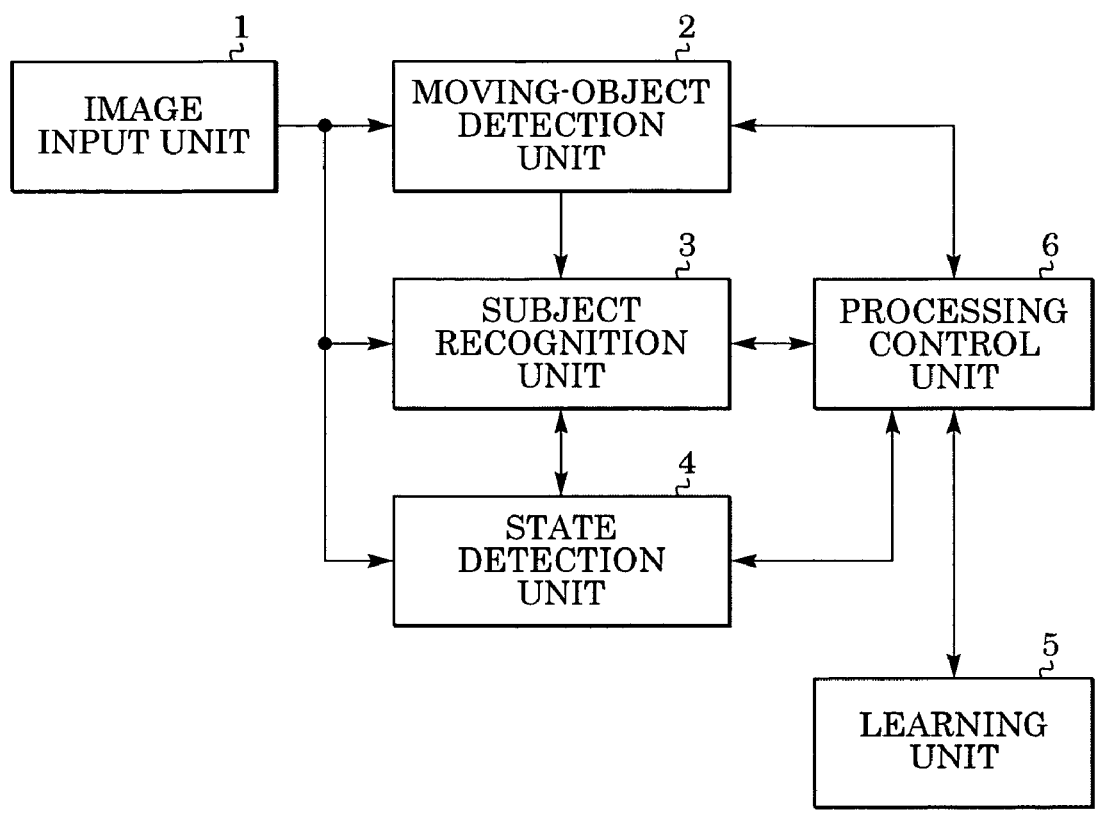
FIG. 1 is a schematic diagram of an action recognition apparatus according to a first embodiment of the present invention.

FIG. 1 is a schematic diagram of an action recognition apparatus according to a first embodiment of the present invention.

Referring to FIG. 1, the action recognition apparatus includes an image input unit 1 for inputting moving image data from an imaging unit or a database (not shown); a moving-object detection unit 2 for detecting and outputting a dynamic (moving) area based on motion vectors and other features of the input moving image data; a subject recognition unit 3 for recognizing a subject, such as a person or an object, located in the detected dynamic area and outputting the recognition result; a state detection unit 4 for detecting an action and a state of a person serving as the subject recognized by the subject recognition unit 3; a learning unit 5 for learning person-specific meaning of the action or state detected by the state detection unit 4 and for storing the meaning in predetermined storage means; and a processing control unit 6 for controlling the startup and stop of processing by the moving-object detection unit 2, the subject recognition unit 3, the state detection unit 4, and the learning unit 5 and changes in processing mode of these units.

The term "action" in this specification indicates a change involving body movement, such as a change in (hand) gesture, eyes, and facial expression, if the subject is a person. The term "state" indicates almost static predetermined postures, such as "sitting" and "lying", or a combination of changes in actions, such as "having a meal" and "smiling", that provide some semantic interpretation. The action category and the state category described below may include semantic actions of moving several parts of the human body simultaneously, such as "having a meal" and "walking", as well as local movement of body parts, such as "waving a hand", "touching hair", and "raising a hand".

Figure 2:
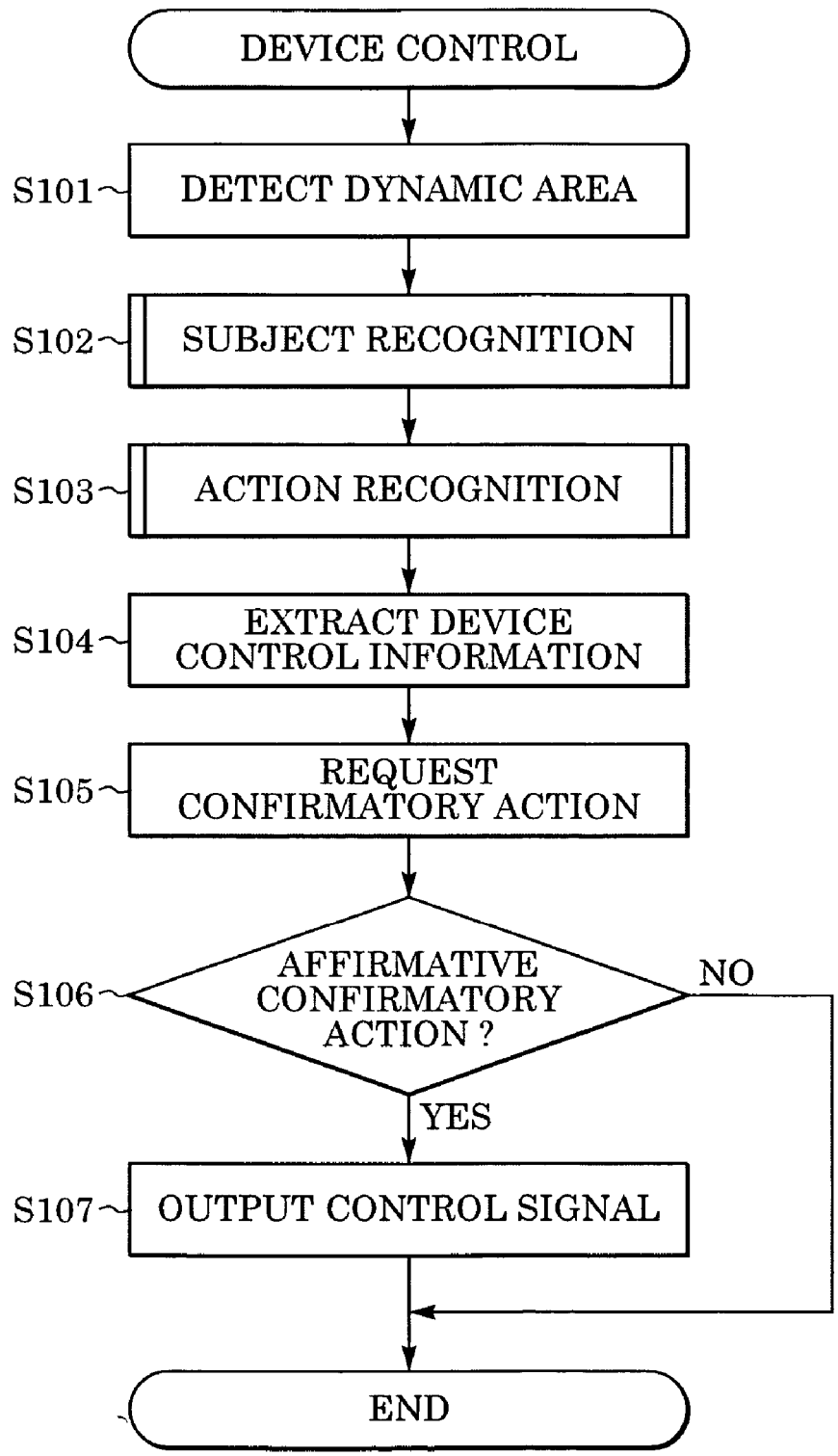
FIG. 2 is a flowchart depicting action recognition processing carried out by an action recognition apparatus.

FIG. 2 is a flowchart depicting device control processing carried out by the action recognition apparatus shown in FIG. 1.

Referring to FIG. 2, the moving-object detection unit 2 first detects a dynamic area from the time-series image data input by the image input unit 1 (step S101). The subject recognition unit 3 carries out the subject recognition processing in FIG. 3 described below to recognize the subject person by the use of image data in the dynamic area (step S102). The state detection unit 4 carries out the action recognition processing in FIG. 4 described below to extract the action category corresponding to the action of the subject person (step S103). Then, device control information specific to this person serving as a subject and the action category is extracted from a dictionary data generation unit (not shown) in the learning unit 5 (step S104).

Next, the processing control unit 6 displays a message or outputs sound to ask the subject person to do an action for confirming the content (meaning) of the device control information extracted in step S104 (e.g., by means of a gesture, a facial expression, nodding or shaking the head, affirmative or negative verbal response) (step S105). The processing control unit 6 then determines whether the subject person has performed an affirmative confirmatory action in response to the device control information extracted in step S104 (step S106). If the person has performed an affirmative confirmatory action, the processing control unit 6 outputs the extracted device control information as a device control signal (step S107) to complete the present processing. If the person has not performed an affirmative confirmatory action, the processing control unit 6 completes the present processing without outputting a device control signal. The confirmatory action from persons as subjects can be preset for each of the subject persons, or a common sign or message can be set for the confirmatory action.

According to the processing in FIG. 2, device control information specific to the subject person and the action category are extracted from the dictionary data generation unit (not shown) in the learning unit 5 (step S104). This enables device operations to be controlled based on actions of the person serving as a subject.

For the device control information, the person's action of, for example, "thrusting a left-handed fist towards a device in the room" can be assigned device control content "to startup the device". A wide variety of device operation content can be assigned, such as "to turn ON/OFF a television set", "to turn UP/DOWN a television set", "to switch ON/OFF a light", "to boil water", "to startup a computer", and "startup a particular computer program". Here, an action itself identifies the device to be controlled, and therefore the person need not perform an action to indicate that he or she is paying attention to the device to be controlled.

In addition to a single control operation as described above, device control procedures can be represented by a combination of a series of control operations, such as "to turn ON the television set and dim the light".

An action and device control procedure associated with each other in this manner can be defined according to individual persons serving as subjects. Thus, a device can be set such that it can be operated and controlled only by a person authenticated from an appearance and action of the person, as described above.

Furthermore, any action is acceptable for extracting device control information, as long as the action obviously differs from everyday actions of the person.

Figure 3:
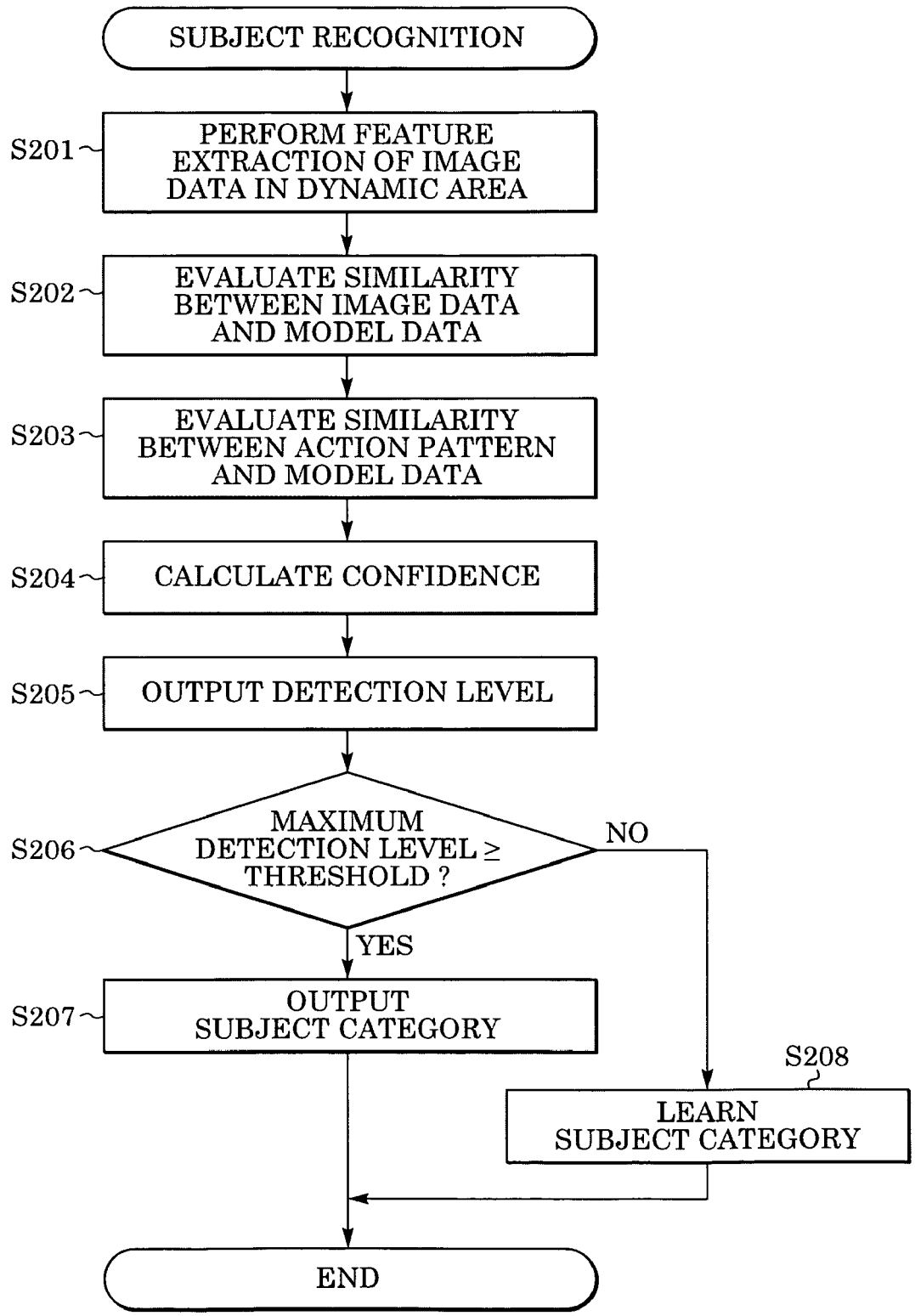
FIG. 3 is a flowchart depicting subject recognition processing.

FIG. 3 is a flowchart showing the subject recognition processing of step S102 in FIG. 2.

The present processing presumes that the learning unit 5 pre-stores in the recording unit (not shown) model data related to image data of postures of a particular person and model data related to actions specific to the person such that the model data are associated with the corresponding subject category.

Referring to FIG. 3, geometrical features or the color-related features are extracted from the image data of the dynamic area (step S201). Then, the degree of similarity between the extracted feature of the image data and the model data pre-set for each subject person is evaluated (step S202). This degree of similarity is evaluated as a correlation coefficient with the model data or the saliency of the particular subject category. The saliency is evaluated based on, for example, the ratio of Cmax to Cnext, where Cmax is the maximum correlation coefficient with respect to the model data and Cnext is the second largest correlation coefficient, or based on the kurtosis of the correlation coefficient distribution classified according to subject category. The kurtosis of distribution "a" is calculated based on the expression shown below:

$$\text{kurtosis}(a) = (1/N) \cdot (a - \tilde{a})4/\sigma(a)4 - 3$$

where σ is the variance of distribution "a", "ã" is the average of distribution "a", and N is the number of samples.

The degree of similarity of geometrical features is evaluated as follows. That is, template matching is performed at each level of a predetermined hierarchical structure of geometrical features detected in a local area (e.g., see Japanese Patent Publication No. 3078166 by the assignee). More specifically, the hierarchical structure includes, for example, a first level of relatively simple patterns (e.g., line segments with specific direction components; and V-shaped, L-shaped, and T-shaped corner patterns generated by combining line segments), a second level of intermediately complicated patterns expressed as a combination of simple patterns or the relationship among the relative positions of the simple patterns, and a third level of highly complicated patterns generated by a combination of intermediately complicated patterns.

Next, the subject recognition unit 3 inputs the feature of the action pattern extracted from the state detection unit 4 and evaluates the degree of similarity between the feature of the action pattern and the action-related model data (step S203). The subject recognition unit 3 then calculates the confidence coefficients about the feature of the image data and the feature of the action pattern (step S204), and applies weighting to similarities of the features according to the respective calculated confidence coefficients and outputs the result (step S205). The subject recognition unit 3 then detects the output similarity to determine whether the maximum detection level in input image is a threshold or more (step S206). If the maximum detection level is the threshold or more, the subject recognition unit 3 outputs, as a subject recognition result, the subject category corresponding to the model data giving the maximum detection level (step S207). If the maximum detection level is below the threshold, the subject recognition unit 3 learns the subject category associated with the feature of image data or action pattern (step S208) to complete the present processing.

The above-described processing is carried out based on, for example, an image of the head acquired by detecting the upper body, in particular, the head image of a person and actions of the person. The learning unit 5 pre-stores in the recording unit (not shown) model data of heads associated with a plurality of postures of a particular person, as well as model data related to action patterns specific to the person. It is sufficient to discretely sample, in predetermined angle steps, postures of the person for whom model data is generated. It is not necessary to prepare such a large amount of model data that continuously covers most postures.

Here, any matching method is acceptable. For example, a method where template matching is performed by adjusting the size of the existing model data to the size of the dynamic area detected by the moving-object detection unit 2 or a method where the matching performance is constant regardless of variable subject sizes (e.g., see Japanese Patent Publication No. 3078166 by the assignee) is acceptable.

In a case where the confidence coefficient of the matching result is expected to be low (e.g., because the subject shows the appearance as viewed from behind or the face image has a low contrast due to the light), the extraction of the subject category is performed based on the consistency with the action category. More specifically, it is determined whether the subject estimated based on the image data has an action feature peculiar thereto (e.g., walking pattern, posture). In this case, the subject recognition unit 3 refers to the dictionary data in the learning unit 5, and if the subject does not have a characteristic action feature, the subject recognition unit 3 outputs information indicating that the identification of the subject is difficult. In response to this, the processing control unit 6 aborts the subsequent processing.

The confidence coefficient about the feature of the image data is evaluated by applying weighting according to the detection level of similarity of the feature required to detect a potential subject category, the observation position (e.g., whether the frontal position or dorsal position) corresponding to the image data, and the orientation of the detected subject, where the largest weighting factor is applied to the observation position or direction optimal for the recognition of the subject and a lower weighting factor is applied to an image from an observation position not suitable for recognition.

For example, such a pre-setting is required that if a predetermined area or more of the front face of a person can be detected for the authentication of the person, the maximum confidence coefficient is given, whereas a person as viewed from behind generally gives a lower level of distinctiveness than the front face and thus is given a low confidence coefficient. If a person as viewed from behind provides a feature peculiar to the person and the feature is detected, then such a modification is required that a higher confidence coefficient is given to the appearance as viewed from behind. Thus, a value obtained by multiplying such factors of saliency (personality index) is used for the confidence coefficient. It is also necessary to preset such that if the saliency is lower than a threshold, the saliency is assigned a predetermined constant, such as one.

The procedure for calculating the saliency (personality index) includes, for example, obtaining data of the appearance as viewed from an averaged head (by gender) image vector or the feature vector after feature extraction and calculating the eigenvector from the covariance matrix related to the feature vector, and then extracting the saliency as a deviation (absolute value of differences) from the mean vector of the coordinate values in the eigenvector space.

On the other hand, the confidence coefficient about the feature of action pattern is evaluated based on, for example, the SN ratio of time-series feature data, the ratio of the threshold to the degree of similarity between the model data and the time-series feature data, or the variance of the maximum degree of similarity calculated in a predetermined period of time. Furthermore, an index (i.e., degree of personality) representing whether the detected action pattern is peculiar to the subject person may be pre-evaluated for the action feature category, so that the confidence coefficient is multiplied by the index.

The action pattern is detected for two reasons: to extract semantic information for device control and to perform individual authentication. Device control can be personalized to be suitable for the particular person in the following manner. That is, the person as a subject is recognized only from image data of an appearance of the person to detect action patterns of the person. Alternatively, the subject is recognized from an action pattern only, and the device control information is extracted from a different action pattern. In addition, device control can also be performed based on particular action patterns after the subject has been authenticated from both the feature of an image pattern and the feature of an action pattern.

Also in the above-described action detection for the purpose of authentication, an action pattern and image data of the person serving as a subject are combined to enhance the confidence coefficient. For example, the walking pattern data and a head image of the subject person are used in combination. Detection of a walking pattern can be performed, for example, by extracting an appearance pattern from the image, extracting the feature quantity (e.g., histograms in the horizontal and vertical directions) from the appearance data, and performing matching of the pattern of a change in feature quantities.

The feature quantity related to the personality of an action may be obtained as follows. That is, an average action pattern is extracted from the time-series feature data used for action pattern detection, and further the eigen action vector is extracted from the covariance matrix of the time-series feature data to extract as the personality the deviation from the mean vector of the coordinate value in the eigenvector space.

According to the processing in FIG. 3, an appearance and an action are used in combination to perform authentication (step S202 and step S203). This enables the subject person to be recognized with a high confidence coefficient.

Figure 4:
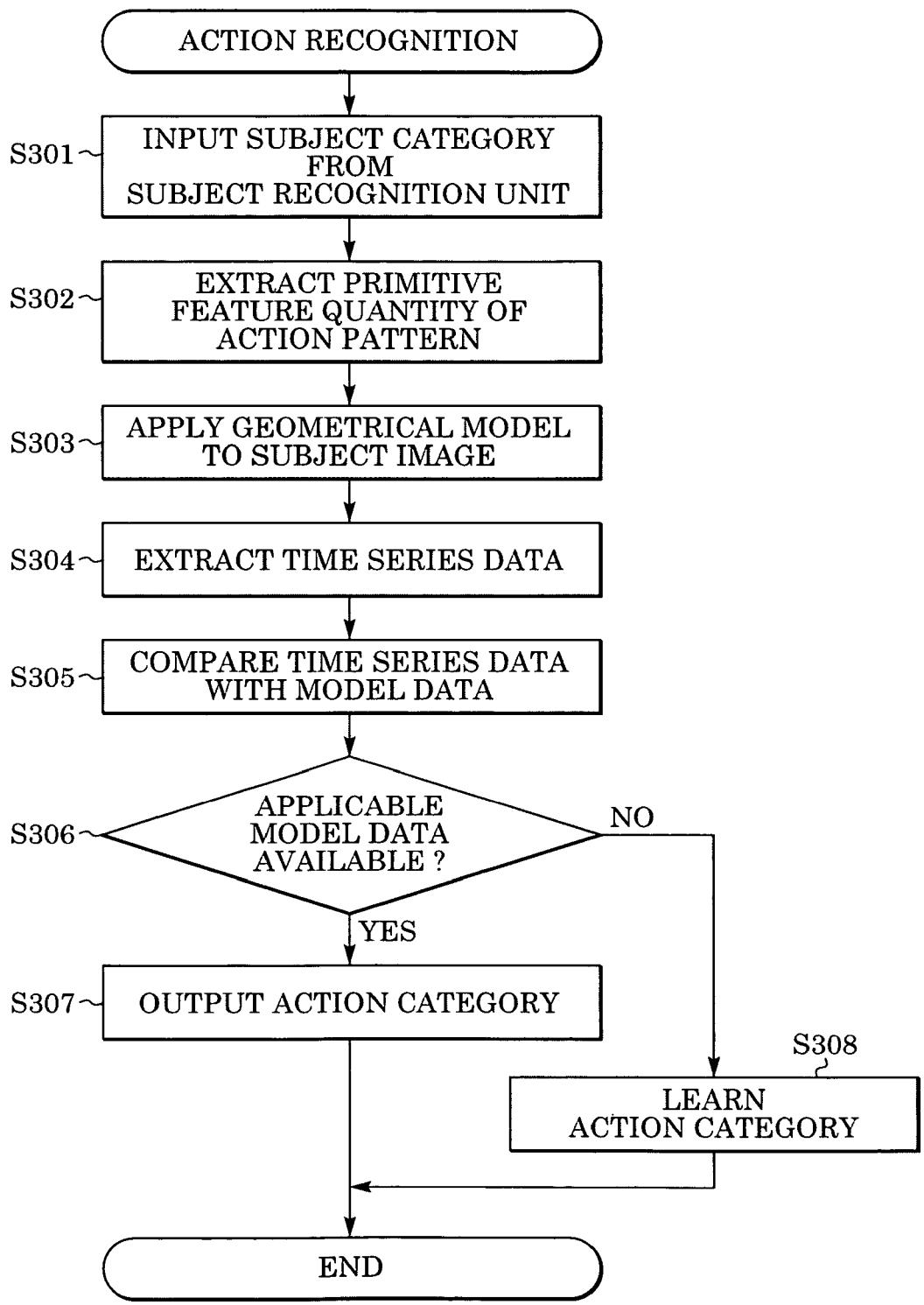
FIG. 4 is a flowchart depicting action recognition processing.

FIG. 4 is a flowchart of the action recognition processing of step S103 in FIG. 2.

The present processing is carried out after the completion of the subject recognition processing of step S102 in FIG. 2 to detect an action or a state with predetermined meaning intended by the identified person. For this purpose, here, action-related body parts (e.g., face, eye, arm, hand, and foot) are detected, the detected feature point or feature quantity is extracted, and any changes in feature points or feature quantities over time are analyzed. For this purpose, however, a method different from that described may be used.

In the present processing, it is presumed that the recording unit in the learning unit 5 pre-stores an action category associated with the model data of the feature point or feature quantity extracted from image data.

Referring to FIG. 4, the subject category obtained as a result of the recognition processing is input from the subject recognition unit 3 (step S301). Then, as a preliminary step of extracting the feature of action pattern, primitive feature quantities related to the subject are extracted (step S302). In the current processing, geometrical features or color-based features are extracted from the difference image with respect to the background image and are used as the feature quantity for detecting the action pattern. Alternatively, an edge feature obtained from the difference between image frames after each of the image frames has been subjected to edge extraction can be used.

Next, fitting of a geometrical model is applied to the image of the subject (step S303). For example, if the subject is a person, feature extraction for action pattern detection is performed by detecting parts of the human body and the feature quantities of the parts, based on a human body model that uses geometrical models corresponding to parts of a human body approximated to pre-simplified three-dimensional parts models (e.g., cylinder, ellipsoid, super-quadrics). Alternatively, the person's head is detected first, followed by the estimation of the range where the arm, hand, foot, etc. exist with respect to the location of the detected head and the posture. In the latter case, parts may be detected by detecting a skin color or motion vector distribution in the corresponding area.

Next, feature quantities (e.g., local and geometrical feature, motion vector, color-based feature) of each of parts constituting the subject person are stored in predetermined storage means as the average feature quantity near a representative point in each of the parts, and then time-series image data of the representative point in each of the parts is extracted (step S304). The extracted time-series image data is compared with model data (step S305) to determine whether model data corresponding to the time-series image data exists (step S306). If model data corresponding to the time-series image data exists, the action category corresponding to the model data having a highest degree of similarity to the time-series image data is output (step S307) and the present processing ends. If no model data corresponding to the time-series image data exists, the present processing ends by learning the action category associated with the time-series image data (step S308).

According to the processing in FIG. 4, if model data corresponding to the time-series image data does not exist (NO in step S306), learning of the action category associated with the time-series image data is performed (step S308). As a result, learning of actions classified according to the subject person can be performed easily.

Details of techniques for extracting person actions are described in, for example, Hoshino, "Jinbutsu Dousa Niokeru Kosei No Chushutsu To Saikousei," The Institute of Image Electronics Engineers of Japan, Volume 30, pp. 631-640, 2001. Fundamental methods of matching to model data include a method for associating transition series of input image with a model based on Dynamic Time Warping (T. J. Darell and A. P. Pentland, 1993 "Space-Time Gestures"), a method for estimating state transition of action based on hidden Markov model using a probability model (J. Yamato, J. Ohya, and K. Ishii, 1992 "Recognizing Human Action in Time-Sequential Images Using Hidden Markov Model," Proc. CVPR, pp. 379-385), and a method based on Continuous Dynamic Programming of time-space edge image vector sequence (Nishimura, Oka "Gesture Dougazou No Gyakuji-kandousa Ya Seishidousa Wo Spotting Ninshiki Surutameno Non-monotonic Renzoku DP," Technical Report of IEICE, PRMU 96-32, pp. 49-56, 1996).

In addition to the above-described methods, action recognition by the state detection unit 4 can be performed by detecting an action category that gives the minimum distance between the time-series pattern of the model feature quantity corresponding to the action category and the time-series pattern of the detected feature quantity in a predetermined feature quantity space. Furthermore, the minimum distance being a predetermined threshold or less may be set, so that the minimum distance above the threshold may indicate the detection of an unclassified action category.

For the learning processing of action patterns performed in the learning unit 5 (step S308), if the distance between the feature quantity sequence representing the action pattern and the model feature quantity sequence data is a certain threshold or more, the time-series image data related to the feature point or feature quantity corresponding to the detected action is saved, and furthermore, the action pattern is given a tentative label, so that a learning sequence for registering the semantic information of the corresponding action pattern is started up by the processing control unit 6. The learning sequence may be performed based on an audio dialog.

Furthermore, the image data of the action pattern recorded and saved without a successful matching to an action category may be displayed on a predetermined display unit, so that the action pattern is automatically associated with a device operation when the person confirms the action pattern and then performs a relevant device operation. This confirmation can be performed by a predetermined method including an audio-based operation, action-based operation, keyboard operation, and switch operation.

Furthermore, the person may be informed of unsuccessful action category matching by means of a visual message on a display unit, lighting of a predetermined lamp, or sound, so that the person can recognize that the system is ready for accepting the registration of semantic information corresponding to the action that has just been made. As a result, the person may perform device operation to cause the device operation content to be automatically associated with the action that has just been made.

Registered associations of action patterns with device control information can be modified or re-registered. Modification of a registered association is to associate an action pattern that has been associated with some device control information with other device control information. Re-registration of a registered association is to change a predetermined action pattern associated with predetermined device control information to another similar action pattern.

Modification or re-registration of registered association is performed as follows. First, the person presents the action recognition apparatus according to the present invention with a predetermined standard action or state that asks the system to enter a modification or re-registration mode. Alternatively, a device having the action recognition apparatus embedded therein may be structured such that the modification or re-registration mode is automatically entered when a button on a predetermined terminal provided in the device is operated.

Furthermore, with the action recognition apparatus according to the present embodiment, the same device can be shared by a plurality of persons, where the order of priority given to the persons is predetermined. In addition, in such a case, some persons may be given priority in one time slot, while other persons are given priority in another time slot.

If the action recognition apparatus according to the present embodiment is used for a man-machine interface, the subject person is automatically authenticated before the person conveys his or her intention to operate the device by means of an action, such as a gesture, and regardless of whether the person intends to operate the device. Furthermore, since actions performed by the subject person are associated with device operation information, the person need not convey explicitly his or her intention to operate the device.

The above-described action recognition apparatus, which functions as a man-machine interface device for automatically learning user's intention, can be embedded in devices in home or office (e.g., television set, stereo set, personal computer, display unit, robot, light appliances, air conditioner, refrigerator, or desk) to control such devices. Furthermore, the action recognition apparatus can be installed on a ceiling, wall, or door of a building to construct an automatic device control system for detecting and learning device operations intended by individual persons based on a gesture or a facial expression.

According to the above-described first embodiment, learning of subject-by-subject actions can be performed easily by the processing in FIG. 4, the subject can be recognized with a high confidence coefficient by the processing in FIG. 3, and device operations can be controlled based on actions of the subject by the processing in FIG. 2.

Figure 5:
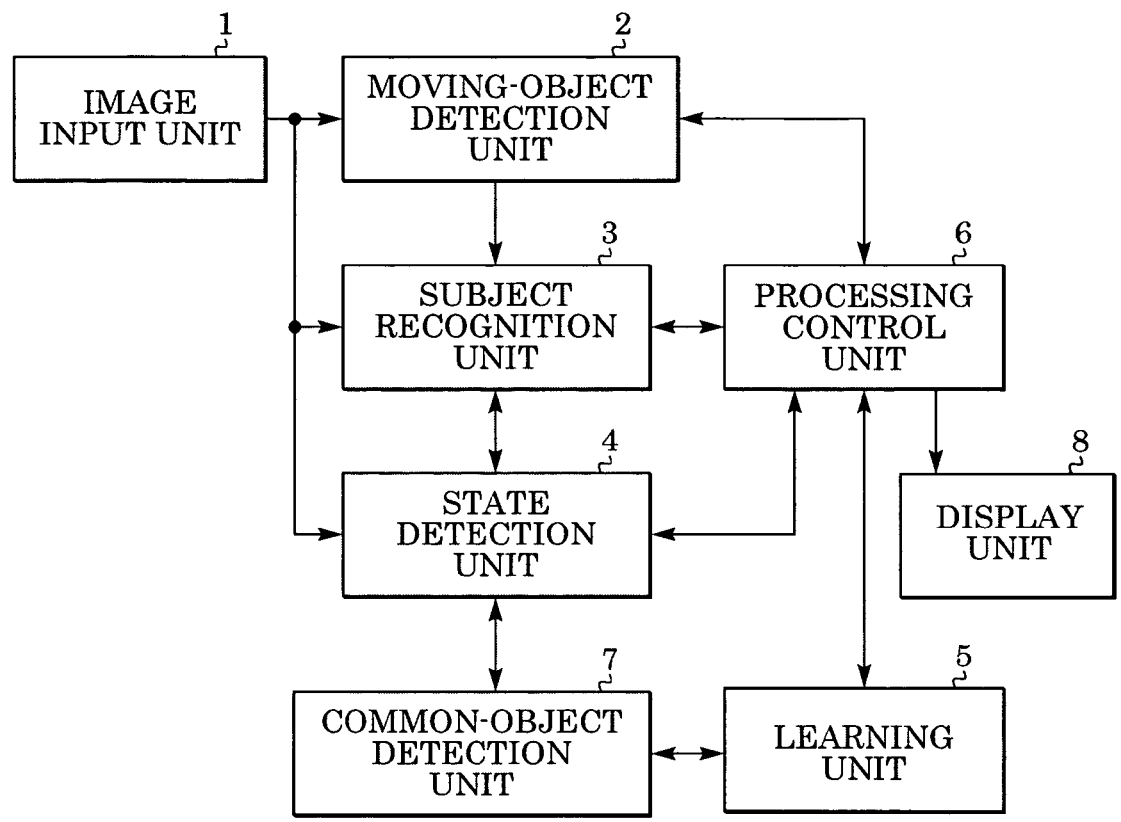
FIG. 5 is a schematic diagram of an action recognition apparatus according to a second embodiment of the present invention.

FIG. 5 is a schematic diagram depicting an action recognition apparatus according to a second embodiment of the present invention.

Figure 6:
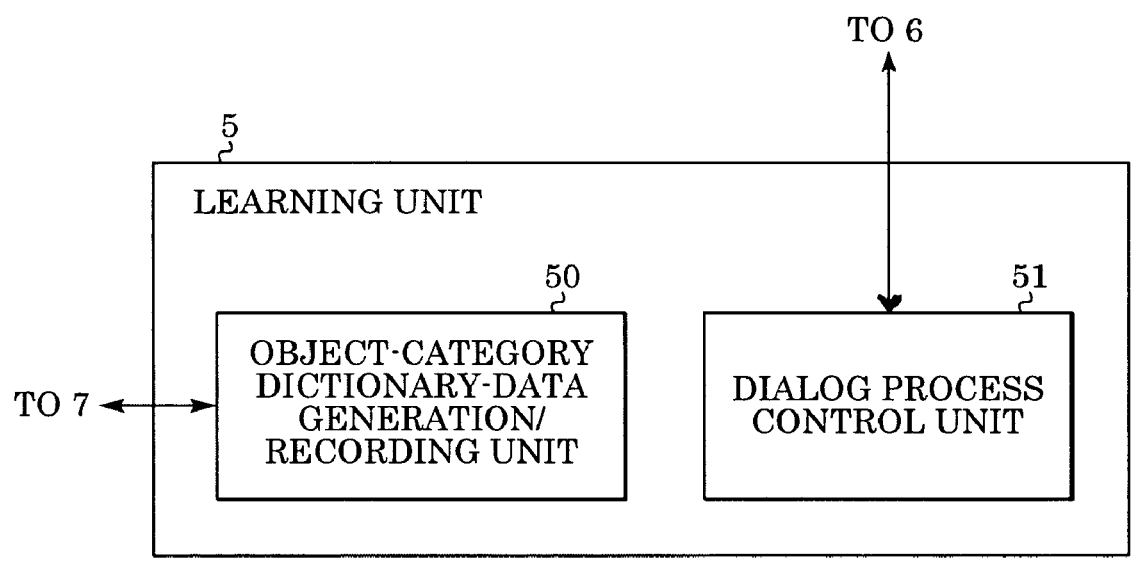
FIG. 6 is a block diagram depicting the internal structure of a learning unit.

The action recognition apparatus in FIG. 5 is the same as that in FIG. 1, except that the learning unit 5 has the structure shown in FIG. 6 and that the apparatus in FIG. 5 additionally includes an object-for-daily-use detection unit 7 for detecting and registering objects-for-daily-use. As shown, the object-for-daily-use detection unit 7 is connected to the state detection unit 4 and the learning unit 5. The term object-for-daily-use refers to objects such as tools, devices, and apparatuses that are frequently used by the person serving as a subject. Examples of such objects are coffee cups, bedclothes, toothbrushes, and books.

The action recognition apparatus according to the present embodiment can be incorporated in a state monitoring system (including two or more cameras and one or more action recognition apparatuses according to the present embodiment) installed in a building to detect the locations of object-for-daily-use appertaining to a particular person in a short time and without a special transmitter or a marker.

FIG. 6 is a block diagram depicting the internal structure of the learning unit 5 shown in FIG. 5.

Referring to FIG. 6, the learning unit 5 includes an object-category dictionary-data generation/recording unit 50 for learning and recording categories and a dialog process control unit 51 for asking a question to the subject person by means of an audio message or a visual message on the display unit.

Figure 7:
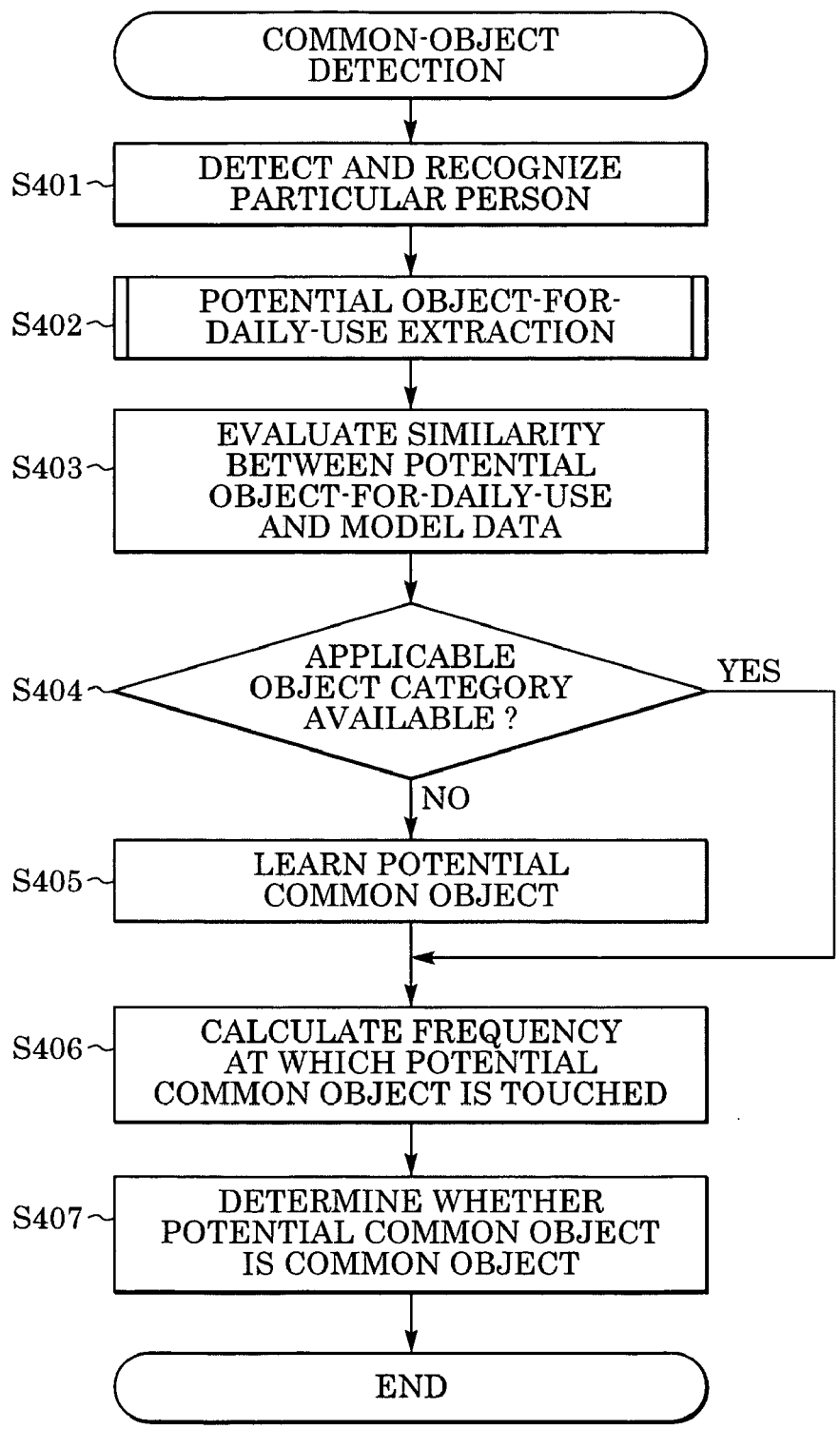
FIG. 7 is a flowchart depicting object-for-daily-use detection processing carried out by an object-for-daily-use detection unit.

FIG. 7 is a flowchart for object-for-daily-use detection processing carried out by the object-for-daily-use detection unit 7 shown in FIG. 5.

Figure 8:
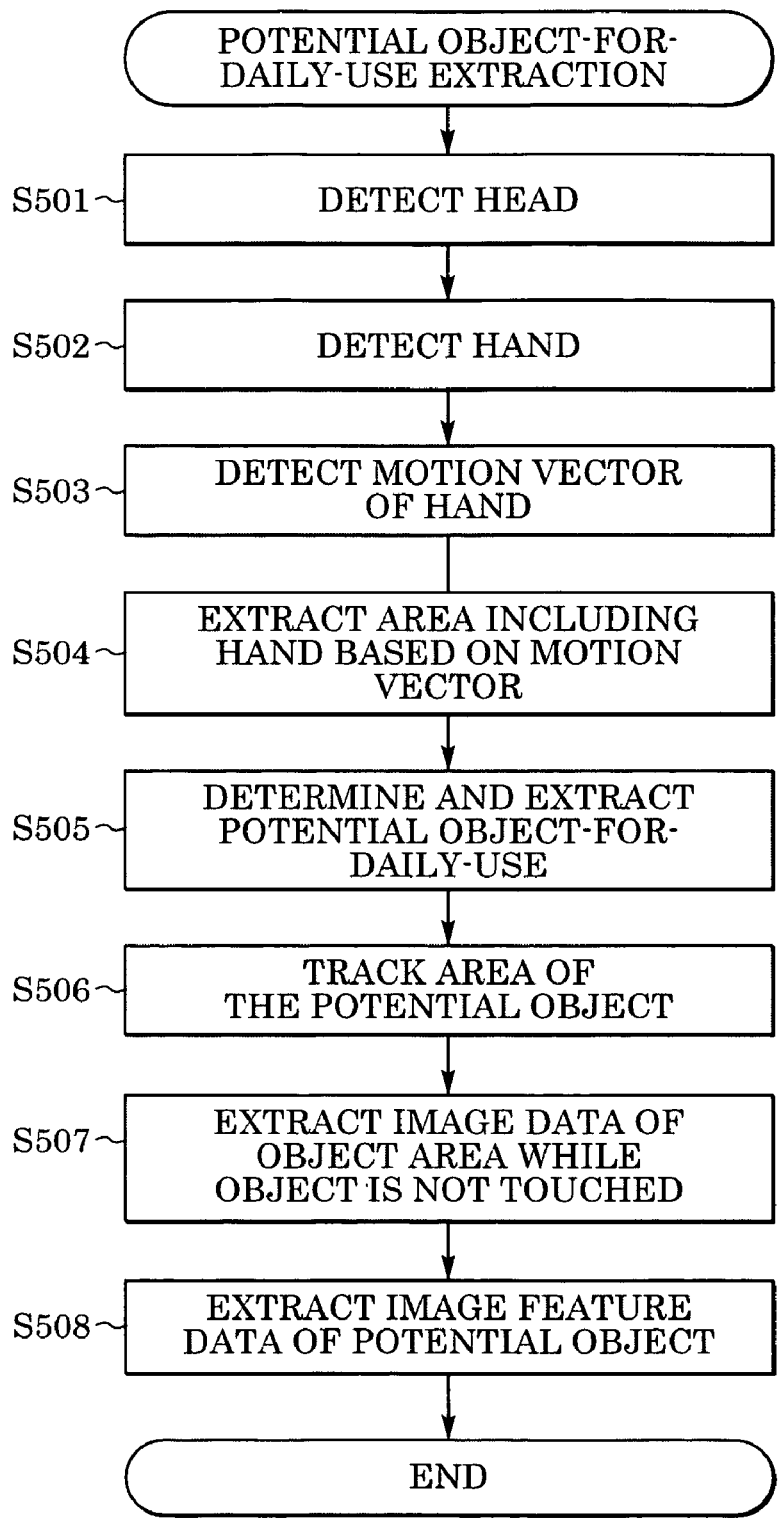
FIG. 8 is a flowchart depicting potential-object-for-daily-use extraction processing.

Referring to FIG. 7, detection processing of an object-for-daily-use begins by detecting a particular person (step S401), followed by the potential-object-for-daily-use extraction processing in FIG. 8. With the potential-object-for-daily-use extraction processing, an object (feature data thereof) that is being touched by the particular person for more than a predetermined period of time (e.g., 3 seconds) is detected (step S402). A search is made for model data of registered potential objects-for-daily-use in the object-category dictionary-data generation/recording unit 50 of the learning unit 5 to evaluate the similarity between the found model data and the detected feature data (step S403). Thereafter, it is determined whether an object category corresponding to the detected feature data is registered in the object-category dictionary-data generation/recording unit 50 (step S404).

The word "touch" in step S402 means an action for bringing a hand, a foot, or the entire body into contact with a predetermined object (e.g., gripping, grasping, lying on, putting on, petting, or knocking the object). To detect this touching (or contacting) state, it is necessary to detect both the body part that touches the object and the object that is touched by the body part. In the present embodiment, "gripping" is presumed as an action of touching an object. In this case, an object that moves along with the body part beyond the wrist is detected as the object being touched.

If it is determined in step S404 that an object category corresponding to the detected feature data is not registered or such a determination is difficult, then the potential object-for-daily-use is learned as a new object category (step S405), and the flow proceeds to step S406. In contrast, if it is determined in step S404 that an object category corresponding to the feature data of the detected object is registered, the flow skips the learning in step S405 to step S406. In step S406, the frequency counter of the corresponding object category is incremented and stored, and then the weekly or monthly frequency at which a hand of the particular person touches the relevant object category (potential object-for-daily-use) is read out (step S406). If the calculated frequency is above a predetermined threshold (e.g., five times in a week), then the object is determined as an object-for-daily-use (step S407), and then the current processing ends.

For the learning processing in step S405, the dialog process control unit 51 in the learning unit 5 is started up to make a request to the person serving as a subject for the name of the object by means of an audio message or a visual message on the display unit. For example, an image of the potential object-for-daily-use is displayed on a predetermined display unit and a question "What is this object?" is issued by means of an audio message or a visual message on the display unit. The name of the object obtained by recognizing and analyzing an audio response or key-entry-based response to this question is registered in the object category dictionary together with the already stored image data and related information. In this case, it is sufficient to record, for example, the name of the particular person acting as the subject who is touching the object, the name of the object category or the image data of the potential object-for-daily-use, and the average frequency or the cumulative value of the frequency at which the object is touched.

FIG. 8 is a flowchart for the potential-object-for-daily-use extraction processing of step S402 in FIG. 7.

Referring to FIG. 8, the person's head as a dynamic area is first detected (step S501). The detection of the head is performed by searching for an area satisfying the following conditions in the image. That is, the area must be a dynamic area that can be approximated as ellipsis, where a face (for the front of the head), a hair color (for the back of the head), or a skin color (for the front to the side of the head) is detected.

Next, a hand (or a palm, the back of a hand, a fingertip, or the like) is detected (step S502). The detection of a hand is performed as follows. That is, a dynamic distal area exhibiting a skin color, neighboring but excluding the head, is detected as a potential hand area. Then, for example, template matching for the part beyond the wrist is applied to the potential hand area. Here, the distal area refers to the area from the wrist to the fingertips. This distal area is extracted by evaluating the similarity between image data generated through perspective transformation using a three-dimensional geometrical model for the corresponding area and the actual image data or by associating the generated image data with the actual data. The size of the potential hand area is determined with respect to the detected head size, and thus areas that are substantially larger or smaller than the head size are ruled out. The detection of the hand is performed not only by the above-described method but by other methods.

Next, in order to pre-evaluate the conformity of the movement of the hand area, the motion vector of the hand area is detected (step S503), and an area that neighbors the hand area and whose motion vector substantially corresponds to that of the hand area is extracted based on the distribution of the motion vector (step S504). Thus, the object in the extracted area is determined as a potential object of daily use (step S505), and thereafter the object area is tracked (step S506). In an untouched state after the potential object has been released, that is, after the hand has been separated from the potential object, the image data of this detected object is stored in predetermined storage means (step S507) and the current processing is completed by performing feature extraction for recognizing the potential object (step S508).

According to the above-described second embodiment, as described with reference to FIG. 7, the potential-object-for-daily-use extraction processing in FIG. 8 is performed to detect an object touched by a particular person for more than a predetermined period of time (step S402), and the learning of the potential object is performed if it is determined that an object category corresponding to the detected feature data is not registered in the object-category dictionary-data generation/recording unit 50 or if such a determination is difficult (step S405). Thus, the learning of the detected object-for-daily-use pertaining to the particular person is performed such that the object-for-daily-use is associated with the person. As a result, it can be determined whether a certain object is used by many persons.

Furthermore, the action recognition apparatus according to the present embodiment can be incorporated in a monitoring system or a robot to enable the monitoring system or the robot to issue a warning if a third party attempts to use an object that usually should be used by a particular person.

Figure 9:
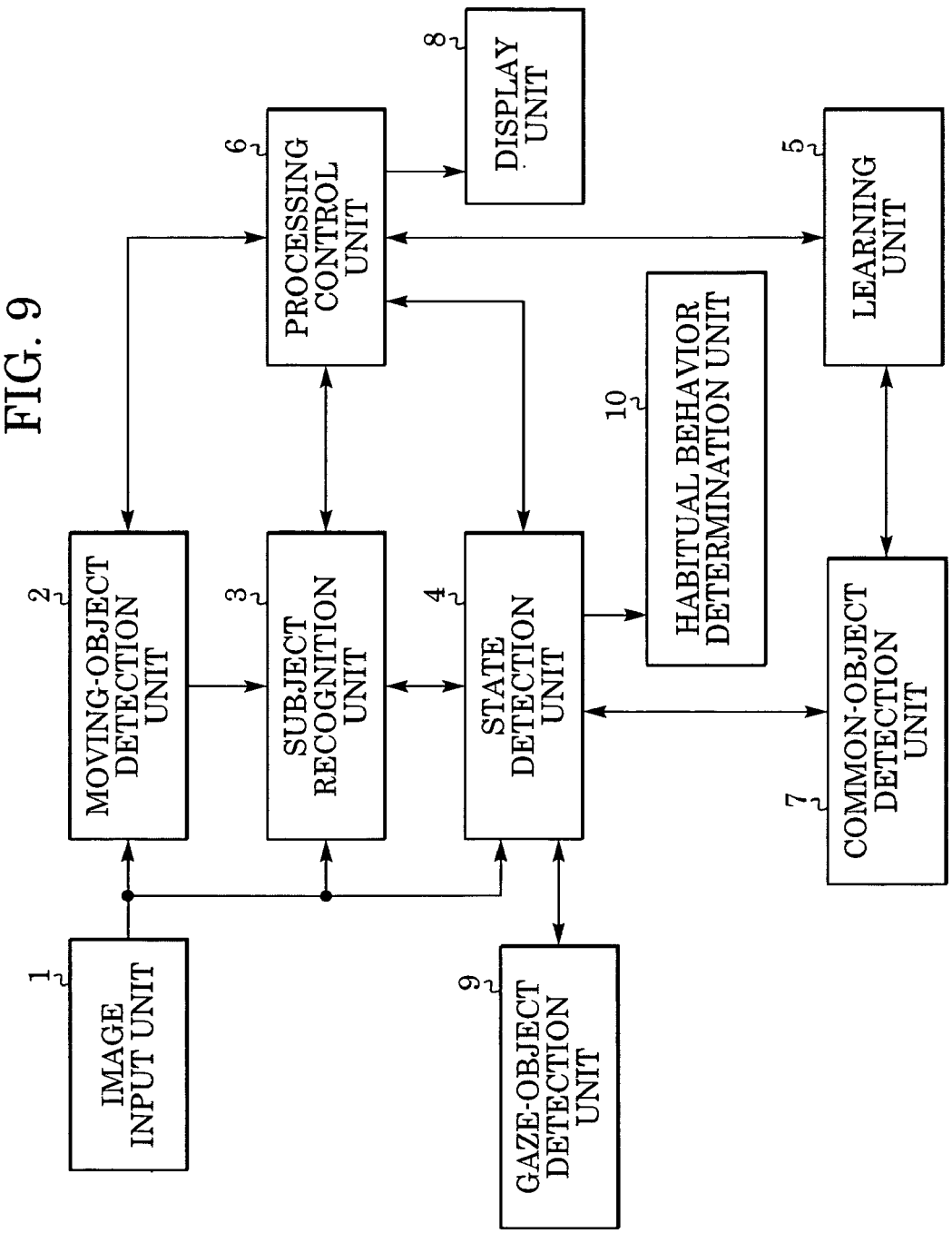
FIG. 9 is a schematic diagram of an action recognition apparatus according to a third embodiment of the present invention.

FIG. 9 is a schematic diagram showing an action recognition apparatus according to a third embodiment of the present invention.

Figure 12A:
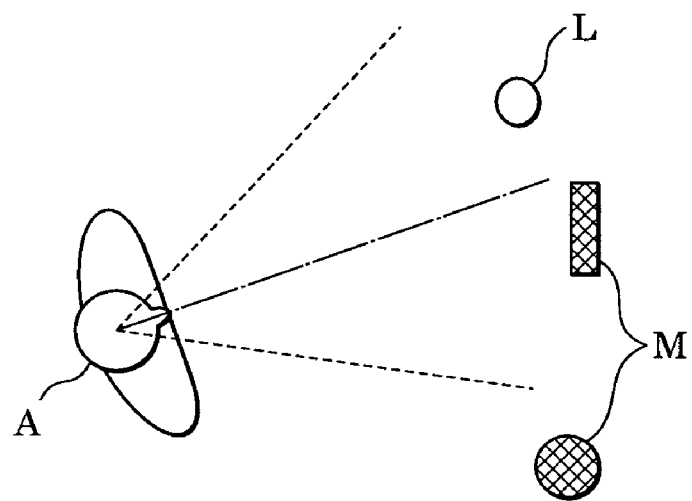
FIG. 12A illustrates gazed-object-category extraction processing carried out by a gazed-object detection unit, where the observation position is above a person.
Figure 12B:
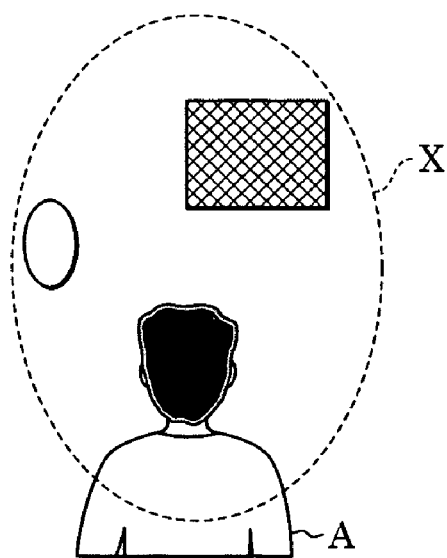
FIG. 12B illustrates gazed-object-category extraction processing carried out by a gazed-object detection unit, where the observation position is behind a person.

The action recognition apparatus in FIG. 9 is the same as that in FIG. 5, except that the apparatus in FIG. 9 additionally includes a gazed-object detection unit 9 for performing gazed-object-category extraction processing in FIGS. 12A and 12B and a habitual behavior determination unit 10 for detecting and learning habitual behavior of a subject person using time-series image data from a predetermined observation position. As shown, the habitual behavior determination unit 10 is connected to the state detection unit 4.

The term "habitual behavior" refers to such behavior performed relatively frequently by a particular subject person that is associated with at least one of a place and a time slot. With the learning and detection of such habitual behavior, person authentication and automatic device/environmental setting appropriate for habitual behavior patterns of the person can be achieved. If the present embodiment is to be applied to person authentication, a person residing at a location relatively far away from the observation position can be authenticated by detecting such habitual behavior patterns as primary visual cue and by using the face and other appearances of the person as secondary cue.

As described above, a "state" detected by the state detection unit 4 generally refers to an almost static predetermined posture or a posture with only a small change in motion. According to the present embodiment, the state detection unit 4 records time-series image data and feature quantity data corresponding to a state category 20 in FIGS. 10A and 10B, and extracts a semantically interpretable state category by detecting a "posture, facial-expression, fundamental-motion category" 21 related to the person serving as a subject and detecting a target-object category 23 related to an object touched or gazed at by the person serving as a subject.

The term "semantically interpretable state" refers to an action (e.g., to watch, to do) that can be associated with a target object (e.g., television set, book), such as "watching TV", "reading a book", "having a meal", and "meditating". A "semantically interpretable state" also refers to a state that does not have a target object as a physical entity and is not associated with a particular action, such as "diet" and "meditation", where the state is given some meaning beforehand and stored in storage means of the dictionary data generation/recording unit 50 of the learning unit 5 with the given meaning in the form of an action pattern that involves a facial expression or movement of a hand, a foot, or the like or that is defined as seen in a particular place or time slot.

FIGS. 10A and 10B show expression forms of state categories in dictionary data. FIG. 10A shows a representation form where a target object of an action is present, and FIG. 10B shows a representation form where a target object of an action is not present.

Referring to FIG. 10A, the state category 20 involving a target object is expressed with a "posture, facial-expression, fundamental-motion category" 21, an "observation place or time slot" 22, and a target-object category 23. The target-object category 23 includes at least one of a touched-object category 24 and a gazed-object category 25.

For example, a state category 20 "watching TV" is described by detecting two categories: the fundamental-motion category 21 "gazing" and the gazed-object category "TV".

Referring to FIG. 10B, a state category 20 that does not involve a target object (e.g., "meditating") is described with a "posture, facial-expression, fundamental-motion category" 21 and an "observation place or time slot" 22.

Thus, a state that involves neither a gazed object nor a touched object (e.g., "meditation" defined as a state where a person remains in a standing or sitting posture with his/her eyes closed for a predetermined period of time) can also be pre-defined as a semantically interpretable state in the form of a combination of a plurality of simple components (e.g., "meditation" can be pre-defined by a combination of components "closed eyes", "upper body in a fixed (semi) standing position", and "static face oriented in the forward direction").

According to the present embodiment, in most cases, a state category that is identifiable by detecting an object category including at least one of a touched object and a gazed object and an action category is detected. When a state category is to be identified, information about the "observation place or time slot" 22 may further be extracted, as described above.

As a result, for example, a combination of "a dish full of food" detected as a touched or gazed object and "bringing a hand close to the mouth" detected as an action category at a dining table (information about a place) is regarded as a state category "having a meal". The same state category need not be associated with only one particular touched object (gazed object) category or action category. In other words, it is also acceptable that one state category is described in association with a plurality of touched object categories and action categories, and the state category is identified if one of the touched object categories and action categories is detected.

Figure 11:
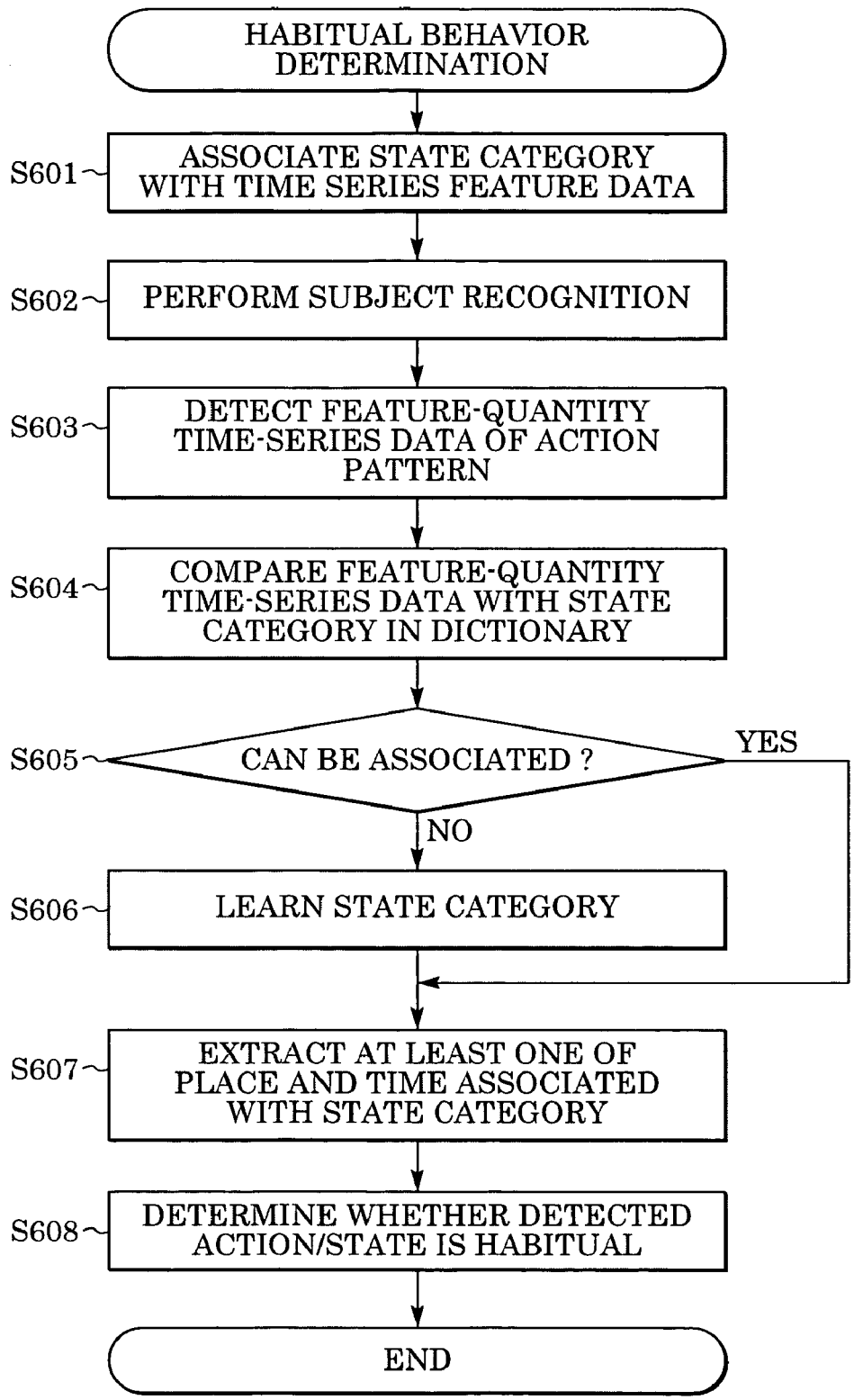
FIG. 11 is a flowchart depicting habitual behavior determination processing carried out by a habitual behavior determination unit.

FIG. 11 is a flowchart for habitual behavior determination processing carried out by the habitual behavior determination unit 10 in FIG. 9.

Referring to FIG. 11, the state category is associated with time-series feature data (step S601). As described above, the association of the state category with time-series feature data is performed interactively using the dictionary data generation/recording unit 50 in the learning unit 5, or it is presumed that for the state category, the storage means of the dictionary data generation/recording unit 50 pre-stores time-series image data of the feature quantity related to the action pattern corresponding to a standard state category. Next, a subject person is detected from the input moving image in order to perform subject recognition processing in the same manner as with the above-described embodiment based on an action pattern or an appearance exhibited by the person (step S602).

Then, feature-quantity time-series image data of the action pattern of the identified person (e.g., time-series information about each representative point in parts constituting the person serving as a subject) is detected (step S603). The state detection unit 4 compares the time-series image data with a state category in the dictionary (step S604). In step S604, the above-described gazed-object category or touched-object category is also extracted, and the action category is then extracted. Thereafter, the classification of the state category is performed based on technologies such as a neural network, statistical processing, and fuzzy inference.

Subsequently, it is determined whether the time-series image data can be associated with the state category in the dictionary (step S605). If the time-series image data cannot be associated with any of state category in the dictionary or such an association is difficult, the time-series image data is learned as a new state category (step S606), and the flow proceeds to step S607. In contrast, if the time-series image data can be associated with the state category in the dictionary in step S605, the flow proceeds to step S607. Furthermore, the time-series image data is stored in a predetermined storage device along with one of the place and the time slot associated with the state category (step S607).

The learning processing in step S606 is performed by the learning unit 5 that generates dictionary data in which the time-series feature quantity data is associated with the action category and state category. The learning processing can be performed via an interaction between the user and the system.

Finally, the frequency at which the extracted state category is observed is calculated. States or actions with a frequency of, for example, three or more times per week are regarded as habitual behavior when the determination in step S608 is made, and the current processing ends.

According to the processing in FIG. 11, feature-quantity time-series image data of the action pattern of the identified person is detected (step S603), and the state category is learned if it is determined that the time-series image data cannot be associated with a state category in the dictionary or if such an association is difficult (step S606). This enables the state category to be learned and the frequency of the state category to be calculated to determine whether the state category is habitual.

The detection processing of the gazed-object category 25 in FIGS. 10A and 10B will now be described. First, the eye direction or the face orientation of the subject person is detected. If the detected direction or orientation is maintained within a viewing angle of about ±10° for more than a predetermined period of time, the person is determined to be in the state "gazing". It is noted that if the eye direction is not constant regardless of a constant face orientation, the person should not be determined to be in the state "gazing".

If it is not clear whether the eyes are open because of failure of the front face even if the face orientation can be detected, processing is performed presuming that the eyes are open. In such a case, however, the state "gazing" may be determined by detecting other actions or postures, because "gazing" could be expressed in various movements or postures.

For extraction processing, the gazed-object detection unit 9 stores, as a gazed-object category in the storage unit of the state detection unit 4, an object that exists in the eye direction or the face orientation and that can be a gazed object, and compares the image data of the object with stored gazed-object categories to extract the gazed-object category that gives the maximum degree of similarity.

FIGS. 12A and 12B are drawings for describing gazed-object-category extraction processing carried out by the gazed-object detection unit 9 in FIG. 9. FIG. 12A shows a case where the observation position is above a person A, and FIG. 12B shows a case where the observation position is behind the person A.

If, as shown in FIG. 12A, the observation position is above the person A, for example, if a camera is installed at a position sufficiently higher than the person A, such as on the ceiling, such that the camera looks down at the person A, then a gazed object M is an object that belongs to the gazed-object category and that exists within a predetermined range of viewing angle (e.g., 30°) with respect to the face orientation (or the eye direction) of the person A. An object L is not registered in the dictionary, and is not a gazed object. The face orientation is defined as the direction of the line connecting the center of the head and the top of the nose (i.e., protruded portion of the head).

If, as shown in FIG. 12B, the observation position is behind the person A and an object to be gazed at by the person is not hidden by the person A, an object that is shown in the image and that exists near (as viewed from behind) the person A is a possible object category. In general, a search range X of this gazed object varies depending on the relative distance between the person A and the object viewed from the observation position of the action recognition apparatus. According to the present embodiment, the distance to the person A is estimated based on the size of the person's head viewed from the observation position of the action recognition apparatus, and a predetermined range of viewing angle with respect to the person is presumed to be the search range X.

In this case, if possible, the action recognition apparatus can make a rough estimation of the face orientation by means of, for example, pre-association processing (calibration) based on an image of the back of the head to presume that a predetermined range of viewing angle with respect to the estimated face orientation of the person A is the search range X.

The identification of the gazed-object category may be performed using images from a plurality of observation positions. For example, a potential-gazed-object category is extracted from each of the observation positions above and behind the person A to find a common category. Furthermore, if the image input means (imaging unit) of the action recognition apparatus is installed at a position other than the above-described positions, for example, a position where only half of the face of the person A is observed, estimation of a gazed object from the observation position is not performed.

According to the processing in FIG. 12, the gazed-object category of the object that is gazed at by the subject can be extracted.

According to the above-described third embodiment, habituality can be determined by extracting a gazed-object category via the processing in FIG. 12 and learning the state category and calculating the frequency of the state category via the processing in FIG. 11.

According to the above-described first to third embodiments, a subject person can be identified based on the confidence coefficients of both image data and an action pattern, and the subject person can be identified with high accuracy even if the person exists at far away position or the lighting conditions vary greatly. Furthermore, device control can be personalized by learning the meaning of an action such that the action is associated with a particular person serving as a subject. In addition, objects-for-daily-use and habitual behavior patterns of a particular person can be detected and learned easily.

The present invention may also be realized by supplying a system or an apparatus with a recording (storage) medium storing software program code, i.e., computer-executable process steps, for realizing the function of the present invention, and then causing the computer (CPU or MPU) of the system or the apparatus to read and execute the supplied program code.

In this case, the program code itself read from the recording medium realizes the function of the present invention, and therefore, the recording medium storing the program code is also covered by the present invention.

As described above, the function of the present invention is achieved with the execution of the program code read by the computer. In addition, the function of the present invention may also be achieved by, for example, the OS running on the computer that performs all or part of the processing according to the commands of the program code.

Furthermore, the function of the present invention may also be achieved such that the program code read from a recording medium is written to a memory provided in an expansion card disposed in the computer or an expansion unit connected to the computer, and then, for example, the CPU provided on the expansion card or the expansion unit performs all or part of the processing based on commands in the program code.

In this case, any form of program, including a program executed as object code or by an interpreter and script data supplied to an OS is acceptable, as long as it functions as a program.

The recording medium for supplying the program code includes a RAM, a NV-RAM, a floppy disk, an optical disk, a magneto-optical disk, a CD-ROM, an MO, a CD-R, a CD-RW, a DVD (DVD-ROM, DVD-RAM, DVD-RW, DVD+RW), a magnetic tape, a non-volatile memory card, and other types of ROMs that can store the above-described program. The above-described program may be downloaded from a computer or database connected to the Internet, a commercial network, or a local area network.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-007924 filed Jan. 15, 2004, which is hereby incorporated by reference herein.

What is claimed is:

1. An action recognition apparatus comprising:
a processor;
a non-transitory computer-readable medium for storing a program, wherein the program causes the processor to function as:
a moving-object detection unit for detecting a dynamic area from time-series image data input by an input unit;
a moving-object identification unit for evaluating a first similarity between geometrical features extracted from the time-series image data of the dynamic area and model data pre-set for each subject person, evaluating a second similarity between a feature of an action pattern extracted from the time-series image data of the dynamic area and action-related model data peculiar to each subject person, and identifying an individual subject person corresponding to the time-series image data of the dynamic area based on a detection level which is output by weighting to both of the first and second similarities, wherein the weighting to both of the first and second similarities is applied based on both an observation position of the time-series image data and an orientation of the individual subject person, the observation position being a position from where the input unit observes the individual subject person;
a state detection unit for detecting an action pattern of the identified individual subject person by the moving-object identification unit from the time-series image data;
a determining unit for determining whether an action category corresponding to the detected action pattern of the identified individual subject person is stored in a recording unit, wherein the action category and the identified individual subject person are associated with device control information specific to the identified individual subject person, the associated device control information being used to control a predetermined device when the action pattern corresponding to the associated action category is performed by the associated individual subject person;
a learning unit for learning an action category corresponding to the detected action pattern performed by the identified individual subject person when the determining unit determines that the action category corresponding to the detected action performed by the identified individual subject person is not stored in the recording unit; and
a control unit for determining whether the identified individual subject person confirms a content of the device control information associated with the action category corresponding to the detected action pattern of the identified individual subject person when the determining unit determines that the action category corresponding to the detected action pattern of the identified individual subject person is stored in the recording unit, and for outputting the device control information as a device control signal when it is determined that the identified individual subject person confirms the content of the device control information.

2. The action recognition apparatus according to claim 1, wherein the state detection unit detects the frequency of the action of the moving object and determines whether the action is habitual based on the frequency.

3. The action recognition apparatus according to claim 1, wherein the state detection unit detects an object touched by the moving object.

4. An action recognition method executed by an action recognition apparatus including a processor, the action recognition method comprising:
a moving-object detection step of detecting a dynamic area from time-series image data input by an input unit;
a moving-object identification step of evaluating a first similarity between geometrical features extracted from the time-series image data of the dynamic area and model data pre-set for each subject person, evaluating a second similarity between a feature of an action pattern extracted from the time-series image data of the dynamic area and action-related model data peculiar to each subject person, and identifying an individual subject person corresponding to the time-series image data of the dynamic area based on a detection level which is output by weighting to both of the first and second similarities, wherein the weighting to both of the first and second similarities is applied based on both an observation position of the time-series image data and an orientation of the individual subject person, the observation position being a position from where the input unit observes the individual subject person;
a state detection step of detecting an action pattern of the identified individual subject person by the moving-object identification unit from the time-series image data;
a determining step of determining whether an action category corresponding to the detected action pattern of the identified individual subject person is stored in a recording unit, wherein the action category and the identified individual subject person are associated with device control information specific to the identified individual subject person, the associated device control information being used to control a predetermined device when the action pattern corresponding to the associated action category is performed by the associated individual subject person;

a learning step, performed by the processor of the action recognition apparatus, of learning an action category corresponding to the detected action pattern performed by the identified individual subject person when it is determined in the determining step that the action category corresponding to the detected action performed by the identified individual subject person is not stored in the recording unit; and a control step of determining whether the identified individual subject person confirms a content of the device control information associated with the action category corresponding to the detected action pattern of the identified individual subject person when it is determined in the determining step that the action category corresponding to the detected action pattern of the identified individual subject person is stored in the recording unit, and outputting the device control information as a device control signal when it is determined that the identified individual subject person confirms the content of the device control information.

5. The action recognition method according to claim 4, wherein, in the state detection step, the frequency of the action of the moving object is detected and it is determined whether the action is habitual based on the frequency.

6. The action recognition method according to claim 4, wherein, in the state detection step, an object touched by the moving object is detected.

7. The action recognition method according to claim 4 further comprising:
a control-signal output step of generating a control signal that controls the predetermined device based on the device control information associated with the action category corresponding to the detected action of the identified subject person.

8. A non-transitory computer readable medium storing a computer-executable program, the program comprising:

a moving-object detection module for detecting a dynamic area from time-series image data input by an input unit;

a moving-object identification module for evaluating a first similarity between geometrical features extracted from the time-series image data of the dynamic area and model data pre-set for each subject person, evaluating a second similarity between a feature of an action pattern extracted from the time-series image data of the dynamic area and action-related model data peculiar to each subject person, and identifying an individual subject person corresponding to the time-series image data of the dynamic area based on a detection level which is output by weighting to both of the first and second similarities, wherein the weighting to both of the first and second similarities is applied based on both an observation position of the time-series image data and an orientation of the individual subject person, the observation position being a position from where the input unit observes the individual subject person;

a state detection step of detecting an action pattern of the identified individual subject person by the moving-object identification unit from the time-series image data;

a determining module for determining whether an action category corresponding to the detected action pattern of the identified individual subject person is stored in a recording unit, wherein the action category and the identified individual subject person are associated with device control information specific to the identified individual subject person, the associated device control information being used to control a predetermined device when the action pattern corresponding to the associated action category is performed by the associated individual subject person;

a learning module for learning an action category corresponding to the detected action performed by the identified individual subject person when the determining module determines that the action category corresponding to the detected action pattern performed by the identified individual subject person is not stored in the recording unit; and a control module for determining whether the identified individual subject person confirms a content of the device control information associated with the action category corresponding to the detected action pattern of the identified individual subject person when the determining module determines that the action category corresponding to the detected action pattern of the identified individual subject person is stored in the recording unit, and for outputting the device control information as a device control signal when it is determined that the identified individual subject person confirms the content of the device control information.

9. A computer readable medium according to claim 8, the program further comprising:
a control-signal output module for generating a control signal that controls the predetermined device based on the device control information associated with the action category corresponding to the detected action of the identified subject person.

10. An action recognition apparatus comprising:
a processor; and
a non-transitory computer-readable medium for storing a program, wherein the program causes the processor to function as:
a moving-object detection unit for detecting a dynamic area from time-series image data input by an input unit; and
an identification unit for evaluating a first similarity between geometrical features extracted from the time-series image data of the dynamic area and model data pre-set for each subject person, evaluating a second similarity between a feature of an action pattern extracted from the time-series image data of the dynamic area and action-related model data peculiar to each subject person, and identifying an individual subject person corresponding to the time-series image data of the dynamic area based on a detection level which is output by weighting to both of the first and second similarities, wherein the weighting to both of the first and second similarities is applied based on both an observation position of the time-series image data and an orientation of the individual subject person, the observation position being a position from where the input unit observes the individual subject person.

11. An action recognition method for an action recognition apparatus including a processor, the action recognition method comprising:
a moving-object detection step of detecting a dynamic area from time-series image data input by an input unit; and
an identification step, performed by the processor, of evaluating a first similarity between geometrical features extracted from the time-series image data of the dynamic area and model data pre-set for each subject person, evaluating a second similarity between a feature of an action pattern extracted from the time-series image data of the dynamic area and action-related model data peculiar to each subject person, and identifying an individual subject person corresponding to the time-series image data of the dynamic area based on a detection level which is output by weighting to both of the first and second similarities, wherein the weighting to both of the first and second similarities is applied based on both an observation position of the time-series image data and an orientation of the individual subject person, the observation position being a position from where the input unit observes the individual subject person.

12. A non-transitory computer readable medium for storing a computer-executable program, the program comprising:
a moving-object detection module for detecting a dynamic area from time-series image data input by an input unit; and
an identification module for evaluating a first similarity between geometrical features extracted from the time-series image data of the dynamic area and model data pre-set for each subject person, evaluating a second similarity between a feature of an action pattern extracted from the time-series image data of the dynamic area and action-related model data peculiar to each subject person, and identifying an individual subject person corresponding to the time-series image data of the dynamic area based on a detection level which is output by weighting to both of the first and second similarities, wherein the weighting to both of the first and second similarities is applied based on both an observation position of the time-series image data and an orientation of the individual subject person, the observation position being a position from where the input unit observes the individual subject person.

* * * * *